United States Patent Office 3,537,865
Patented Nov. 3, 1970

3,537,865
COCOA BUTTER SUBSTITUTE
George A. Daniels, James D. Johnston, and Gene C. Robinson, Baton Rouge, La., assignors to Ethyl Corporation, New York, N.Y., a corporation of Virginia
No Drawing. Filed Oct. 31, 1967, Ser. No. 679,508
Int. Cl. A23d 5/00; A23g 1/00
U.S. Cl. 99—118                               6 Claims

ABSTRACT OF THE DISCLOSURE

Mixtures of triglyceride esters which melt slightly above room temperature and have relatively narrow dilatometric melting ranges are described. These mixtures, which can be readily synthesized from readily available reactants, contain 2-stearoyldidecanoin, 1-stearoyldidecanoin, and optionally and preferably, one or more of 2-stearoyldioctanoin, 1-stearoyldioctanoin, and tridecanoin. The mixtures are useful in the manufacture of confections and the like.

This invention relates to mixtures of triglyceride esters which melt slightly above room temperature and having relatively narrow melting ranges.

Mixtures of triglyceride esters having the foregoing properties find significant commercial uses. For example, cocoa butter is widely used in the manufacture of chocolate coatings, chocolate candy, and other confections. However, inasmuch as many of these widely used triglyceride ester mixtures are derived from natural sources certain problems are often encountered. In the first place, these naturally occurring materials are rather expensive, considerable labor and shipping expenses being encountered. Moreover, these naturally occurring products are susceptible to price fluctuations based on such miscellaneous influencing factors as changes in weather conditions, and the like.

Another factor vis-a-vis these natural products is their complexity and susceptibility to variation in chemical content from batch to batch or region to region. For example, the Journal of the American Oil Chemists' Society, vol. 42, p. 12 (1965) presents comprehensive analytical data on two different samples of cocoa butter which show that this naturally occurring product contains in the order of about thirty different identified chemical species and that the chemical composition of the two samples was not without some significant differences.

Factors such as the foregoing have provided the incentive for the manufacture and sale of synthetic cocoa butter substitutes or "hard butters." While these synthetic substitutes are usually less costly than the natural products, for some uses their melting characteristics are not as desirable as one might wish.

An object of this invention is, therefore, to provide novel mixtures of triglyceride esters which melt slightly above room temperature, which have relatively narrow melting ranges, and which can readily be synthesized at low cost from readily available, abundant articles of commerce. Other important objects will be apparent from the ensuing description and appended claims.

In accordance with this invention it has been discovered that mixtures of 2-stearoyldidecanoin and 1-stearoyldidecanoin in appropriate proportions remain in the solid state up to temperatures in the range of about 30 to about 40° C. and have dilatometric melting ranges not exceeding about 30 centigrade degrees. Mixtures of 2-stearoyldidecanoin and 1-stearoyldidecanoin in a respective mole ratio falling within the range of about 1:3 to about 3:1 are generally most suitable.

A preferred embodiment of this invention involves the further discovery that if the foregoing mixtures of 2-stearoyldidecanoin and 1-stearoyldidecanoin are admixed with minor proportions of certain other triglyceride esters the dilatometric melting range of the resultant system is often less than about 20 centigrade degrees. At the same time the system retains its melting point of between about 30 and about 40° C. The preferred systems in question will contain (in addition to the 2-stearoyldidecanoin and the 1-stearoyldidecanoin) one or more of 2-stearoyldioctanoin, 1-stearoyldioctanoin, and tridecanoin. The melting characteristics of some of these systems are comparable to cocoa butter.

As those skilled in the art will appreciate, 2-stearoyldidecanoin is the equivalent of glycerine (glycerol) whose central hydroxyl group has been esterified with stearic acid (octadecanoic acid) and whose two terminal hydroxyl groups have been esterified with capric acid (decanoic acid). 1-stearoyldidecanoin is a positional isomer such that one of the terminal hydroxyl groups of the glycerine is esterified by stearic acid, the remaining two hydroxyl groups being esterified by the capric acid. By the same token, 2-stearoyldioctanoin has the internal hydroxyl group esterified by stearic acid and its two terminal hydroxyl groups esterified by caprylic acid (octanoic acid). Consequently, 1-stearoyldioctanoin is another isomeric form, in this case one of the terminal hydroxyl groups being esterified by stearic acid, the other two being esterified by caprylic acid. Following the same rules of nomenclature, tridecanoin is glycerine whose three hydroxyl groups have been esterified by capric acid.

One important feature of this invention is the relatively small number of components needed to provide a mixture having the requisite physical characteristics. For many confectionary applications, a simple two-component mixture of 2-stearoyldidecanoin and 1-stearoyldidecanoin is entirely adequate. On the other hand, when providing compositions having melting characteristics comparable to cocoa butter, very good results are afforded by appropriate three, four and five component systems predominating in 2-stearoyldidecanoin and 1-stearoyldidecanoin, such as:

(A)  2-stearoyldidecanoin
     +
     1-stearoyldidecanoin
     +
     2-stearoyldioctanoin
     +
     1-stearoyldioctanoin (B)  2-stearoyldidecanoin
     +
     1-stearoyldidecanoin
     +
     tridecanoin (C)  2-stearoyldidecanoin
     +
     1-stearoyldidecanoin
     +
     1-stearoyldioctanoin (D)  2-stearoyldidecanoin
     +
     1-stearoyldidecanoin
     +
     2-stearoyldioctanoin (E) 2-stearoyldidecanoin
+
1-stearoyldidecanoin
+
2-stearoyldioctanoin
+
tridecanoin (F) 2-stearoyldidecanoin
+
1-stearoyldidecanoin
+
1-stearoyldioctanoin
+
tridecanoin (G) 2-stearoyldidecanoin
+
1-stearoyldidecanoin
+
2-stearoyldioctanoin
+
1-stearoyldioctanoin
+
tridecanoin In providing the compositions of this invention, the mole ratio between the 2-stearoyldidecanoin and the 1-stearoyldidecanoin will generally range from about 1:3 to about 3:1. Mixtures in which the mole ratio (2-stearoyldidecanoin:1-stearoyldidecanoin) is from about 1:1 to about 2:1, and especially from about 1.4:1 to about 1.6:1 are the easiest and least costly to manufacture and thus are preferred. For the same reasons mixtures wherein this ratio is about 1.5:1 are most especially preferred.

As noted above, the systems of this invention predominate on a molar basis in 2-stearoyldidecanoin and 1-stearolydidecanoin. However, the systems preferably also contain one or more of 2-stearolydioctanoin, 1-stearoyldioctanoin, and tridecanoin. Less than 50 mole percent of the total mixture will be made up of such additional component(s).

Another feature of this invention is that in producing the triglycerides effective use can be made of commercially available sources of stearic acid, caprylic acid and/or capric acid. These commercially available products contain predominantly the straight chain saturated aliphatic monocarboylic acid in question but may contain lesser amounts of closely related homologs. Small amounts of branching in the chains does not appear to markedly impair the desirable physical properties of the resultant triglyceride esters. For best results the specified straight chain acids of at least about 90 percent purity should be used and the content of unsaturates should be kept minimal. Thus in producing the compositions of this invention use may be made, for example, of stearic-palmitic acid mixtures derived from various sources such as hydrogenated fats and oils. Exemplary of such suitable mixtures are the following:

| Oil or fat | Percent stearic acid | Percent palmitic acid | Percent other |
|---|---|---|---|
| Soy bean | 93 | 6 | 1 |
| Cotton seed | 87 | 23 | |
| Beef tallow | 63 | 35 | 2.3 |

Therefore, although the present compositions are described herein with reference to the stearoyldidecanoin and stearoyldioctanoin isomers, it will be understood and appreciated that these isomers may be used in conjunction with minor proportions (less than 50 percent) of the corresponding isomers derived from palmitic acid.

By the same token, the caprylic and capric acids used in preparing the present triglyceride compositions may, and most often will, contain small amounts of other homologs. The specifications of typical acids are as follows:

| | Caprylic acid | Capric acid |
|---|---|---|
| B.P., °C | (1) | (2) |
| Acid No | 390 | 330 |
| Carbonyl No | <0.004 | <0.004 |
| Ester value | <0.1 | 0.19 |
| Composition, wt. percent: | | |
| $C_8$ | 97.1 | 5.5 |
| $C_{10}$ | 0.2 | 92.6 |
| Other | 2.7 | 1.9 |

1 88–91°/1 mm.
2 107–118°/1 mm.

Methods for the preparation of the foregoing triglyceride esters are well known and fully documented in the art. For example, to prepare 2-stearoyldidcanoin and also 2-stearoyldioctanoin the procedure described by F. H. Mattson and R. A. Volpenhein, J. Lipid Research, 3, 281 (1962) is found efficacious. This involves first preparing 2-monostearin by acylation of a 20 percent excess of 1,3-dibenzylideneglycerol (cf: H. Hibbert and N. M. Carter, J. Am. Chem. Soc., 51, 1601 (1929)) with equi-molar amounts of pyridine and stearoyl chloride in chloroform solution at room temperature for 24 hours. The 2-monostearin is liberated by borate replacement (cf. J. B. Martin, J. Am. Chem. Soc., 75, 5482 (1953)). Thereupon, the 2-monostearin, after purification by recrystallization, is allowed to react with a 50 percent excess of equi-molar amounts of the appropriate acyl chloride and pyridine in chloroform solution at room temperature for 72 hours.

By the same token, in the preparation of the 1-stearoyldidecanoin as well as the 1-stearoyldioctanoin, effective use may be made of the procedure described by F. H. Mattson and R. A. Volpenhein, J. Lipid Research, 3, 281 (1962).

In this instance one allows the commercially available 1,2-isopropylidene glycerol (20 percent excess) to react with equimolar amounts of stearoyl chloride and pyridine in chloroform solution followed by the borate replacement work-up of Martin (J. B. Martin, J. Am. Chem. Soc., 75, 5482 (1953)) to liberate 1-monostearin. This is acylated by decanoyl chloride or octanoyl chloride as described in the preceding paragraph.

The method described by Feuge, Kraemer, and Bailey (R. O. Feuge, E. A. Kraemer, and A. E. Bailey, Oil and Soap, 22, 202 (1945)) is satisfactory for use in synthesizing tridecanoin.

In order to demonstrate the practice and advantages of this invention, various blends of triglycerides as discussed above were formulated and their melting characteristics determined quantitataively by use of standard dilatometric procedures. The octanoic, decanoic and stearic acids used in the preparative work were commercially available materials. The octanoic and decanoic acids assayed >97 percent purity by v. pc. ($C_8$ acid, M.P. 15–16° C., lit. M.P. 16.3° C.; $C_{10}$ acid M.P. 29–30° C., lit. M.P. 31.5° C.). The stearic acid was indicated by v. pc. to have a purity >99 percent (M.P. 70–72° C., lit. M.P. 70–71° C.). The tridecanoin used in one of the blends (Example VI) was obtained from a commercial source (M.P. 26–29° C., lit. M.P. 31.5° C.). Its purity by v. pc. estimation of the acid portion was approximately 97 percent.

In particular, the dilatometric procedure involved introducing a 2.0 gram sample of the melted triglyceride blend into the bulb of a dilatometer of the type described by Fulton and Lutton, Journal of The American Oil Chemists' Society, vol. 31, p. 98 (1954). The bulb had a volume of approximately 4.3 cc. The confining liquid was mercury. The sample was then subjected to a tempering procedure so as to minimize volume changes at constant temperature over long periods of time. After tempering, dilatometer readings were recorded at a series of increasing temperatures, starting at 0° C. This enabled the determination of both the dilatometric melting range of the system and its dilatometric melting point—i.e., the temperature at which the total sample was transformed into the liquid state of aggregation.

EXAMPLE I

The sample in this experiment was composed of 25 mole percent of 2-stearoyldidecanoin and 75 mole percent of 1-stearoyldidecanoin. The melting point of this blend was found to be 32° C. and it had a narrow dilatometric melting range of 10 centigrade degrees.

EXAMPLE II

The blend in this experiment was an equimolar mixture of 2 - stearoyldidecanoin and 1 - stearoyldidecanoin. Its dilatometric melting point was 37° C. and it had a dilatometric melting range of 22 centigrade degrees.

EXAMPLE III

In this case the system was composed of 75 mole percent 2-stearoyldidecanoin and 25 mole percent of 1-stearoyldidecanoin. Its dilatometric melting point was found to be 41° C. It possessed a dilatometric melting range of 31 centigrade degrees.

EXAMPLE IV

The following mixture of triglycerides was prepared:

| Triglyceride | Mole fraction | Wt. in grams |
| --- | --- | --- |
| 2-stearoyldidecanoin | 0.3704 | 1.9163 |
| 1-stearoyldidecanoin | 0.2469 | 1.2755 |
| 2-stearoyldioctanoin | 0.2296 | 1.0864 |
| 1-stearoyldioctanoin | 0.1531 | 0.7244 |

This blend had a dilatometric melting poitn of 35° C. and a dilatometric melting range of 25 centigrade degrees.

EXAMPLE V

The following triglyceride ester blend was utilized in this experiment:

| Triglyceride | Mole fraction | Wt. in grams |
| --- | --- | --- |
| 2-stearoyldidecanoin | 0.5629 | 1.4147 |
| 1-stearoyldidecanoin | 0.3753 | 0.9432 |
| 2-stearoyldioctanoin | 0.0371 | 0.0854 |
| 1-stearoyldioctanoin | 0.0247 | 0.0569 |

The dilatometric melting point of this system was 40.5° C. and it had a dilatometric melting range of 17.5 centigrade degrees.

EXAMPLE VI

The following triglyceride ester blend was prepared:

| Triglyceride | Mole fraction | Wt. in grams |
| --- | --- | --- |
| 2-stearoyldidecanoin | 0.5629 | 1.4147 |
| 1-stearoyldidecanoin | 0.3753 | 0.9432 |
| Tridecanoin | 0.0618 | 0.1292 |

The dilatometric melting point of this system was 40.5° C. and its dilatometric melting range was 20.5 centigrade degrees.

Utilizing the same procedure as described above, a sample of commercially available cocoa butter and individual samples of two commercially available cocoa butter substitutes were examined. The cocoa butter had a dilatometric melting point of 35.2° C. and a dilatometric melting range of 20 centigrade degrees. One of the cocoa butter substitutes was found to have a dilatometric melting point of 52° C. and a dilatometric melting range of 42 centigrade degrees. The other commercially available cocoa butter substitute had a melting point of 37.5° C. and a dilatometric melting range of 27.5 centigrade degrees. Thus the compositions of this invention may be used in lieu of, or together with, cocoa butter and/or cocoa butter substitutes in the same general fields of application.

We claim:

1. A mixture of triglyceride esters useful as a cocoa butter substitute characterized in that it is composed predominantly of 2-stearoyldidecanoin and 1-stearoyldidecanoin, in that it has a dilatometric melting range not exceeding about 30 centigrade degrees, and in that it has a dilatometric melting point falling in the range of from about 30 to about 40° C.

2. The mixture of claim 1 further characterized in that it additionally contains at least one of the following: 2-stearoyldioctanoin, 1-stearoyldioctanoin, and tridecanoin.

3. The mixture of claim 1 further characterized in that it additionally contains 2-stearoyldioctanoin and 1-stearoyldioctanoin and has a dilatometric melting range not exceeding about 20 centigrade degrees.

4. The mixture of claim 1 further characterized in that it additionally contains tridecanoin and has a dilatometric melting range not exceeding about 20 centigrade degrees.

5. The mixture of claim 1 further characterized in that the mole ratio of 2-stearoyldidecanoin to 1-stearoyldidecanoin is from about 1.4:1 to about 1.6:1, in that the mixture additionally contains 2-stearoyldioctanoin and 1-stearoyldioctanoin, and in that the mixture has a dilatometric melting range not exceeding about 20 centigrade degrees.

6. The mixture of claim 1 further characterized in that the mole ratio of 2-stearoyldidecanoin to 1-stearoyldidecanoin in from about 1.4:1 to about 1.6:1, in that the mixture additionally contains tridecanoin, and in that the mixture has a dilatometric melting range not exceeding about 20 centigrade degrees.

References Cited

UNITED STATES PATENTS 3,410,881  11/1968  Martin et al. ____ 260—410.7 X
3,492,130   1/1970  Harwood _____ 99—118

OTHER REFERENCES

Chemical Abstracts, vol. 61, July 1964, p. 850(a).

MAURICE W. GREENSTEIN, Primary Examiner

U.S. Cl. X.R.

260—410.7